United States Patent
Allen et al.

(10) Patent No.: US 11,144,087 B2
(45) Date of Patent: Oct. 12, 2021

(54) EFFICIENT PERFORMANCE MONITORING OF INTEGRATED CIRCUIT(S) HAVING DISTRIBUTED CLOCKS

(71) Applicant: NVIDIA Corp., Santa Clara, CA (US)

(72) Inventors: Roger Allen, Lake Oswego, OR (US); Alan Menezes, San Jose, CA (US); Tom Ogletree, Lakeway, TX (US); Shounak Kamalapurkar, Austin, TX (US); Abhijat Ranade, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 192 days.

(21) Appl. No.: 16/351,319

(22) Filed: Mar. 12, 2019

(65) Prior Publication Data

US 2020/0050482 A1 Feb. 13, 2020

Related U.S. Application Data

(60) Provisional application No. 62/717,545, filed on Aug. 10, 2018.

(51) Int. Cl.
| | |
|---|---|
| *G06F 1/12* | (2006.01) |
| *G06F 9/48* | (2006.01) |
| *G06F 9/38* | (2018.01) |
| *H04L 12/26* | (2006.01) |
| *G06F 9/30* | (2018.01) |

(52) U.S. Cl.
CPC .............. *G06F 1/12* (2013.01); *G06F 9/30* (2013.01); *G06F 9/3877* (2013.01); *G06F 9/4887* (2013.01); *H04L 43/065* (2013.01)

(58) Field of Classification Search
CPC ..... G06F 9/4887; G06F 9/3877; H04L 43/065
See application file for complete search history.

(56) References Cited

U.S. PATENT DOCUMENTS

| | | | |
|---|---|---|---|
| 6,741,122 B2 * | 5/2004 | Kapoor | G06F 1/10 327/283 |
| 7,702,055 B2 | 4/2010 | Edgar | |
| 9,552,309 B2 * | 1/2017 | Gintis | G06F 11/3485 |
| 10,162,380 B2 * | 12/2018 | Woloschek | H04J 3/0658 |
| 2006/0129999 A1 * | 6/2006 | Hiraoka | G06F 11/3476 717/128 |
| 2018/0203794 A1 * | 7/2018 | Voccio | G06F 8/70 |
| 2019/0050021 A1 * | 2/2019 | Schumacher | G06F 11/3636 |
| 2020/0019483 A1 * | 1/2020 | Norrie | G06F 9/542 |

* cited by examiner

*Primary Examiner* — Jacob D Dascomb
(74) *Attorney, Agent, or Firm* — Artegis Law Group, LLP

(57) ABSTRACT

Performance monitors are placed on computational units in different clock domains of an integrated circuit. A central dispatcher generates trigger signals to the performance monitors to cause the performance monitors to respond to the trigger signals with packets reporting local performance counts for the associated computational units. The data in the packets are correlated into a single clock domain. By applying a trigger and reporting system, the disclosed approach can synchronize the performance metrics of the various computational units in the different clock domains without having to route a complex global clock reference signal to all of the performance monitors.

20 Claims, 4 Drawing Sheets

EFFICIENT PERFORMANCE MONITORING OF INTEGRATED CIRCUIT(S) HAVING DISTRIBUTED CLOCKS

CROSS-REFERENCE TO RELATED APPLICATIONS

This application claims priority and benefit under 35 U.S.C. 119(e) of U.S. Application Ser. No. 62/717,545, filed on Aug. 10, 2018, the contents of which are incorporated by reference in their entirety.

BACKGROUND

During the performance monitoring of one or more integrated circuit devices, performance monitors on the device(s) generate performance metrics often in the form of counts such as, for example, the number of bytes of data processed or the number of instructions executed. The counts are saved or read, and then reset using signals called trigger signals. Performance monitors can be present in different locations on the device(s), which operate at different clock frequencies (different clock domains). Separate from the performance monitors operating at different local clock frequencies, clock frequencies can drift over time. Accordingly, correlating performance metrics from the different performance monitors becomes challenging.

One solution to the problem is to place all the performance metrics into a single clock domain and broadcast a reference clock to all the spatially separated performance monitors. However, such a solution requires the implementation of expensive data and control busses and transmitters and receivers throughout the integrated circuit device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
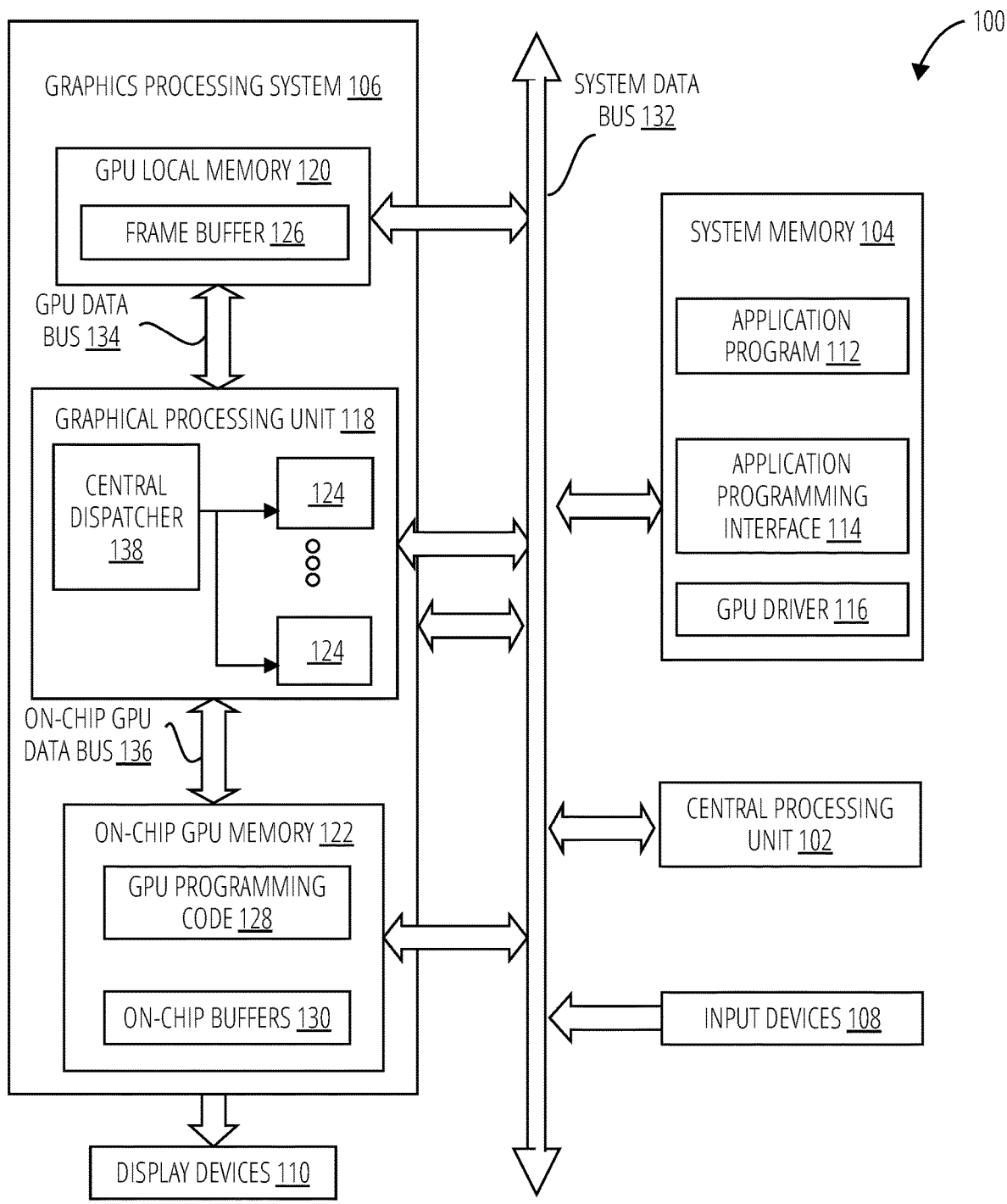
FIG. 1 is a block diagram of an exemplary host device 100 in accordance with an embodiment of the present invention.

Embodiments of a system and techniques are disclosed herein to correlate the outputs of performance monitors in different clock domains across one or more integrated circuit devices. A clock domain refers to set of logic in a device (e.g., one or more computational units of an integrated circuit device) that operate responsive to a clock signal. Thus, logic in different clock domains are responsive to different clock signals. Clock signals may differ, for example, because they oscillate at different frequencies, or are out of phase from each other.

In an embodiment, performance monitors are distributed in various clock domains of an integrated circuit device. Furthermore, a central dispatcher is placed in the integrated circuit in a clock domain with access to a reference clock. In an embodiment, there may be more than one central dispatcher depending on, for example, the size of the integrated circuit device. The central dispatcher may, but is not required to, operate in the domain of the reference clock. In one implementation, the central dispatcher operates in the domain of a clock that is not the reference clock. A central dispatcher generates trigger signals to performance monitors that are distributed around an integrated circuit device. A trigger signal may be a simple edge or level triggering signal, which require a minimal distribution architecture (e.g., a single wire and no encoding or protocol transceivers). The central aspect of the dispatcher refers to the notion that the central dispatcher acts as a common point of origin of trigger signals broadcast to the various performance monitors. The central dispatcher does not need to be physically located centrally among the performance monitors.

A performance monitor responds to a trigger signal by forming a return packet, which may be stored in a memory.

Additionally, a central dispatcher may form a reference packet (which may also be stored in a memory) when it broadcasts a trigger signal to one or more performance monitors. A reference packet includes a value associated with the reference clock (e.g., a "time" or count) and the central dispatcher's identifier for the trigger signal. The identifier may be a count value that is incremented each time a trigger signal is broadcast by the central dispatcher. For example, a reference packet <5, 501200> would indicate that a fifth trigger signal was broadcast from the central dispatcher at or around 501200 nanoseconds from a predetermined epoch for the reference clock. When the central dispatcher is operating in a clock domain that is different from the reference clock, the reference packet may further include a value of a local clock for the domain in which the central dispatcher operates.

Each performance monitor reacts to the trigger signal from the central dispatcher by generating a return packet associating the trigger signal with one or more of a local performance counts, a local clock value, and a local trigger signal identifier. A local trigger signal identifier is an identifier that a performance monitor associates with each trigger signal received from the central dispatcher. Preferably, the local trigger identifier is generated by a performance monitor in the same manner that the central dispatcher generated its trigger identifier so that the central dispatcher and the performance monitor associate the same identifier value to each trigger signal. For example, the return packet <5, 25, 30205> from a performance monitor would indicate that a fifth trigger signal that was received from the central dispatcher at or around a local clock time value of 30205, and when the local performance counter had a count value of 25. The local performance count value (25) may be a count of any performance metric such as, for example, bytes of data processed or instructions executed by the logic being monitored by the performance monitor.

In some embodiments, a performance monitor may cause multiple return packets to be generated for a single trigger signal received. For example, a performance monitor may cause a return packet to be generated that associates only a trigger identifier and a local clock value. The performance monitor may then cause itself and/or other performance monitors in the same clock domain to generate return packets that associate only a trigger identifier with a performance count. Such an allocation of functionality may reduce the total bandwidth of information provided in return packets because only a single local clock value is provided and associated with multiple performance counts being maintained by numerous performance monitors in the same clock domain.

The various reference packets and return packets generated and saved in memory may be analyzed (e.g., by application software) to associate each trigger signal and performance count with the reference clock. In other words, the reference packets and return packets may be processed to place all of the local performance counts into a common timeline of the reference clock.

In an embodiment, the reference packet may include additional information. For example, a reference packet may include a bookmark. A bookmark is a value provided to the central dispatcher from a source external to the central dispatcher. Such an external source may be a register or computational logic external to the central dispatcher. The external source may be located on the same device as the central dispatcher or on a different separate device. A bookmark value may be generated by software executing on a device or may be a value input by a user operating a device.

In an embodiment utilizing multiple central dispatchers, the reference packet may include an identification of the central dispatcher that generated the reference packet. In such an embodiment, the central dispatcher identification may be provided to each central dispatcher from a source external to the central dispatcher.

FIG. 1 is a block diagram of one embodiment of a host device 100 in which one or more aspects of the invention may be implemented. The host device 100 includes a system data bus 132, a CPU 102, one or more input devices 108, a system memory 104, a graphics processing system 106, and one or more display devices 110. In alternate embodiments, the CPU 102, all or portions of the graphics processing system 106, the system data bus 132, system memory 104 or any combination thereof, may be integrated into a single processing unit.

As shown, the system data bus 132 connects the CPU 102, the one or more input devices 108, the system memory 104, and the graphics processing system 106. In alternate embodiments, the system memory 104 may connect directly to the CPU 102. The CPU 102 receives user input from the one or more input devices 108, executes programming instructions stored in the system memory 104, operates on data stored in the system memory 104, and configures the graphics processing system 106 to perform specific tasks. The system memory 104 typically includes dynamic random-access memory (DRAM) employed to store programming instructions and data for processing by the CPU 102 and the graphics processing system 106. The graphics processing system 106 receives instructions/commands transmitted by the CPU 102 and processes them to perform a variety of graphics and compute functions such as, for example, rendering and displaying graphics on the display devices 110 or performing neural network computations.

As also shown, the system memory 104 includes a portion or all of an application program 112, various API 114 (application programming interface), and a graphics processing unit driver 116 (GPU driver). Although not shown in the figures, system memory 104 also includes a portion or all of an operating system. Some of the API 114 provide an interface for the application program 112 to make calls to the operating system. Instructions (such as, e.g., part of application program 112, API 114, operating system, and GPU driver 116), which are stored in system memory 104, can be transferred and executed on CPU 102.

The graphics processing system 106 includes a GPU 118 (graphics processing unit), an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions/commands transmitted by the CPU 102, process them, and store results in the GPU local memory 120.

The GPU 118 includes performance monitors 124 and a central dispatcher 138. The operation of each performance monitors 124 in conjunction with the central dispatcher 138 is described more fully in conjunction with FIG. 3 and FIG. 4.

The central dispatcher 138 may be instructed to broadcast one or more trigger signals. For example, instructions from application program 112 executing on CPU 102 may cause instructions from the operating system to execute on CPU 102 to thereby cause instructions from GPU driver 116 to execute on CPU 102. Continuing with this example, the instructions from GPU driver 116 may then cause certain GPU programming code 128 to be stored on the on-chip GPU memory 122 and cause GPU 118 to execute the GPU programming code 128. Execution of the GPU programming code 128 by the GPU 118 may then cause the central dispatcher 138 to transmit one or more trigger signals to the performance monitors 124. The one or more trigger signals to the performance monitors 124 may be broadcast as a binary level or edge trigger. In some embodiments, a trigger signal to each performance monitor may be received by the performance monitor over a single wire thus requiring a minimal communication infrastructure across an integrated circuit. Each of the performance monitors 124 may be configured to respond to a trigger signal from the central dispatcher 138 or to ignore it. In some cases, the central dispatcher 138 may be configured to broadcast a trigger signal periodically or based on an interrupt received by the GPU 118.

The central dispatcher 138 is illustrated as being part of the GPU 118, however this may not be the case in all embodiments. The central dispatcher 138 may be external to the GPU 118 and may be included in any other integrated circuit device. Additionally, performance monitors 124 may also be include in any other integrated circuit device. As stated above, the techniques disclosed herein are applicable to any device or circuit comprising multiple processing regions operating in different clock domains.

The GPU 118 may be provided with any amount of on-chip GPU memory 122 and GPU local memory 120, including none, and may employ on-chip GPU memory 122, GPU local memory 120, or system memory 104 in any combination for memory operations.

The on-chip GPU memory 122 is configured to include GPU programming code 128 and on-Chip Buffers 130. The GPU programming code 128 may be transmitted from the graphics processing unit driver 116 to the on-chip GPU memory 122 via the system data bus 132. The on-Chip Buffers 130 are typically employed to store data that requires fast access to reduce the latency when executing instructions on the GPU.

The GPU local memory 120 typically includes off-chip dynamic random-access memory (DRAM) and is also employed to store data and instructions utilized by GPU 118. As shown, the GPU local memory 120 includes a frame buffer 126. The frame buffer 126 stores data that may be employed to drive the display devices 110. In general, frame buffer 126 may store data input to or output by the GPU 118. In one example, frame buffer 126 stores one or more graphical images rendered by GPU 118.

The one or more display devices 110 are one or more output devices capable of emitting a visual image corresponding to an input data signal. For example, a display device may be a cathode ray tube (CRT) monitor, a liquid crystal display, or any other suitable display system. The input data signals to the display devices 110 are typically generated by scanning out the contents of one or more graphical images stored in the frame buffer 126.

Figure 2:
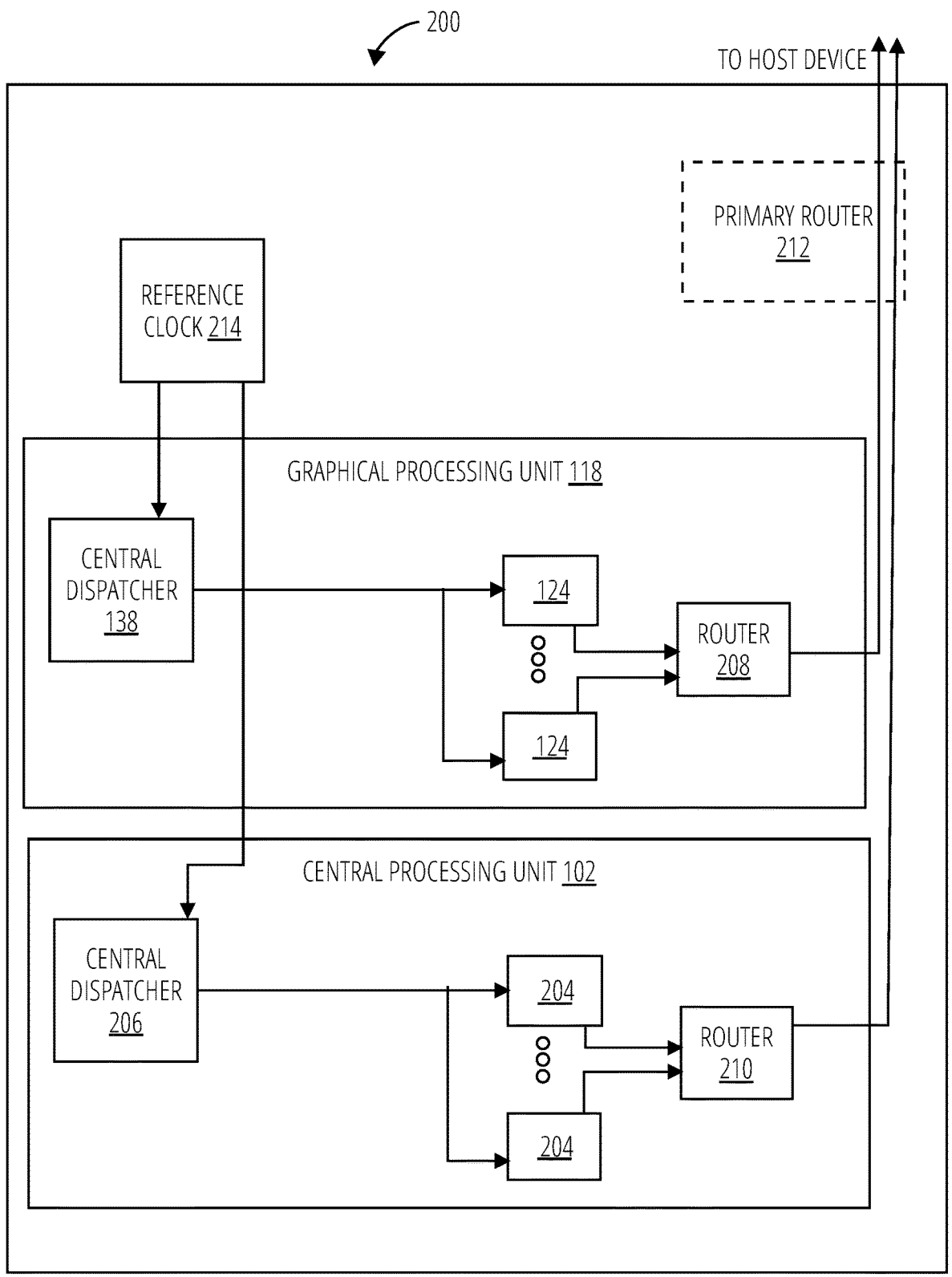
FIG. 2 is a block diagram of an exemplary system-on-a-chip 200 in accordance with an embodiment of the present invention.

FIG. 2 illustrates an exemplary system-on-a-chip 200 in accordance with one embodiment of the present invention. The system-on-a-chip 200 includes a CPU 102, a GPU 118, a reference clock 214, and an optional primary router 212. The GPU 118 includes central dispatcher 138, performance monitors 124, and router 208. The CPU 102 includes central dispatcher 206, performance monitors 204, and router 210.

Each central dispatcher receives a reference clock value from the reference clock 214. The location of the reference clock 214 is a design choice. Generally, the reference clock 214 need not be in the same clock domain as the central dispatchers, although it could be.

The router 208 receives return packets from the performance monitors 124 of the GPU 118. The router 208 may consolidate one or more return packets (such as those originating from one or more performance monitors in a common clock domain) into a single return packet (also referred to as an aggregated return packet) by aggregating the performance counts of the separate return packets together. Such consolidation may produce a substantial reduction in return packet bandwidth to the host device.

The router 208 may also add additional information to a return packet such as, for example, information identifying the clock domain(s) or computing unit(s) associated with the result packet. The central dispatcher 206 and router 210 provide similar functionality for the performance monitors 204 of the CPU 102.

Primary router 212 is optional and may perform additional data reduction and flow control for the return packets.

Figure 3:
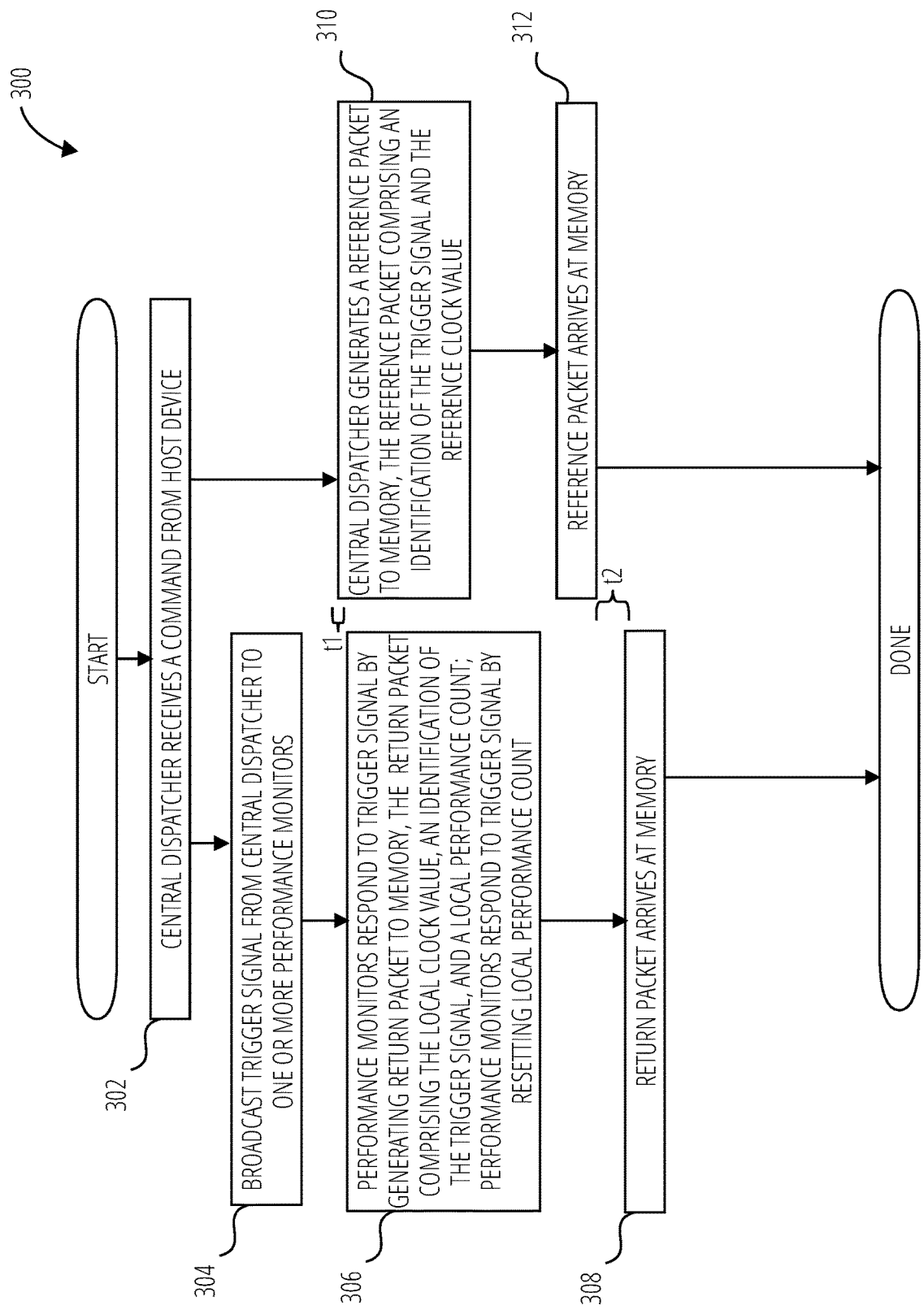
FIG. 3 is an exemplary process 300 in accordance with an embodiment of the present invention.

FIG. 3 provides an exemplary process 300 in accordance with an embodiment of the present invention. The process 300 may be employed in a system that includes a central dispatcher and multiple performance monitors (including systems in which some of the performance monitors operate in different local clock domains).

At block 302, the central dispatcher receives a command from a host device (e.g., as a result of software executing on the host device). In an embodiment, different commands may be received by the central dispatcher. For example, one such command may indicate that the central dispatcher should broadcast a trigger signal to one or more performance monitors. Another command may indicate that the central dispatcher should start broadcasting trigger signals periodically to one or more performance monitors. Another command may indicate that the central dispatcher should stop the periodic broadcasting of trigger signals to one or more performance monitors. The central dispatcher may also receive additional information from the host device such as, for example, the frequency at which periodic broadcasts should be performed, one or more bookmarks, as well as an identification of the one or more performance monitors that should receive trigger signal(s). As noted above, the central dispatcher and performance monitors may be embodied on the host device itself or on one or more other devices separate from the host device.

A host device may cause one or more commands to be sent to the central dispatcher to delineate a unit of work and to perform performance monitoring of the unit of work. For example, prior to a code segment executing, a host device may issue a command to the central dispatcher to start periodic broadcasting of trigger signals. Once the code segment has executed, the host may issue a command to the central dispatcher to stop periodic broadcasting.

In an embodiment, a host device may also cause a bookmark to be sent to the central dispatcher to cause one or more return packets to be labeled with the bookmark during the performance monitoring.

At block 304, the central dispatcher (upon receiving a command from the host) broadcasts a trigger signal from the central dispatcher to one or more performance monitors. In an embodiment, the central dispatcher operates in the clock domain of a reference clock, and each of the one or more performance monitors operates in different clock domain, each domain having a corresponding local clock. In other embodiments the central dispatcher does not operate in the clock domain of the reference clock, but instead has access to a value generated by the reference clock.

At block 310, the central dispatcher generates a reference packet that includes an identification of the trigger signal that was broadcast at block 304 and a reference clock value. The reference packet may include other information as well such as, for example, a unique identifier for the central dispatcher and a bookmark. The reference packet is communicated to memory for storage.

At block 306, each of the performance monitors that receive a trigger signal generates a return packet, which is then stored in the memory. The may occur in parallel with generation of the reference packet at block 310. In an embodiment, each return packet includes a local clock value, an identification of the trigger signal, and a local performance count. The return packet may include other information as well such as, for example, the identifier of the performance monitor that generated the return packet. Additionally at block 306, each of the performance monitors resets its local performance count such as, for example, by setting its performance counter to zero. Preferably, the local clock value continues to advance and is not reset when the return packet is generated.

The interval t1 between generation of the reference packet in block 310 and generation of the return packet(s) in block 306 is sufficiently small to ensure that the reference clock value in the reference packet may be associated with corresponding return packets. In one example, when triggers from a central dispatcher are programmed to occur at a fixed periodic rate, a sufficiently small interval t1 may be approximately 1% of the period between triggers. The acceptable interval t1 will vary by implementation. Generally, the acceptable interval t1 is proportional to the triggering rate of the central dispatcher.

In one embodiment, the central dispatcher may delay generation of the reference packet to memory to account for propagation delays of the trigger signal to the local performance monitors, thus reducing the value of t1.

At block 308 and block 312, the return packet and reference packet arrive at memory. The reference packet may be stored to memory before, after, or while the performance monitors receive the trigger signal and generate the return packet. Generally, these blocks are parallel and asynchronous and the reference packet and return packets may be in-flight to memory at the same time or at different times. So long as the interval t1 is sufficiently small to enable reference packets to be associated with the corresponding return packets, the interval t2 between arrival at the memory of the reference packet and corresponding return packets is not a significant factor.

Figure 4:
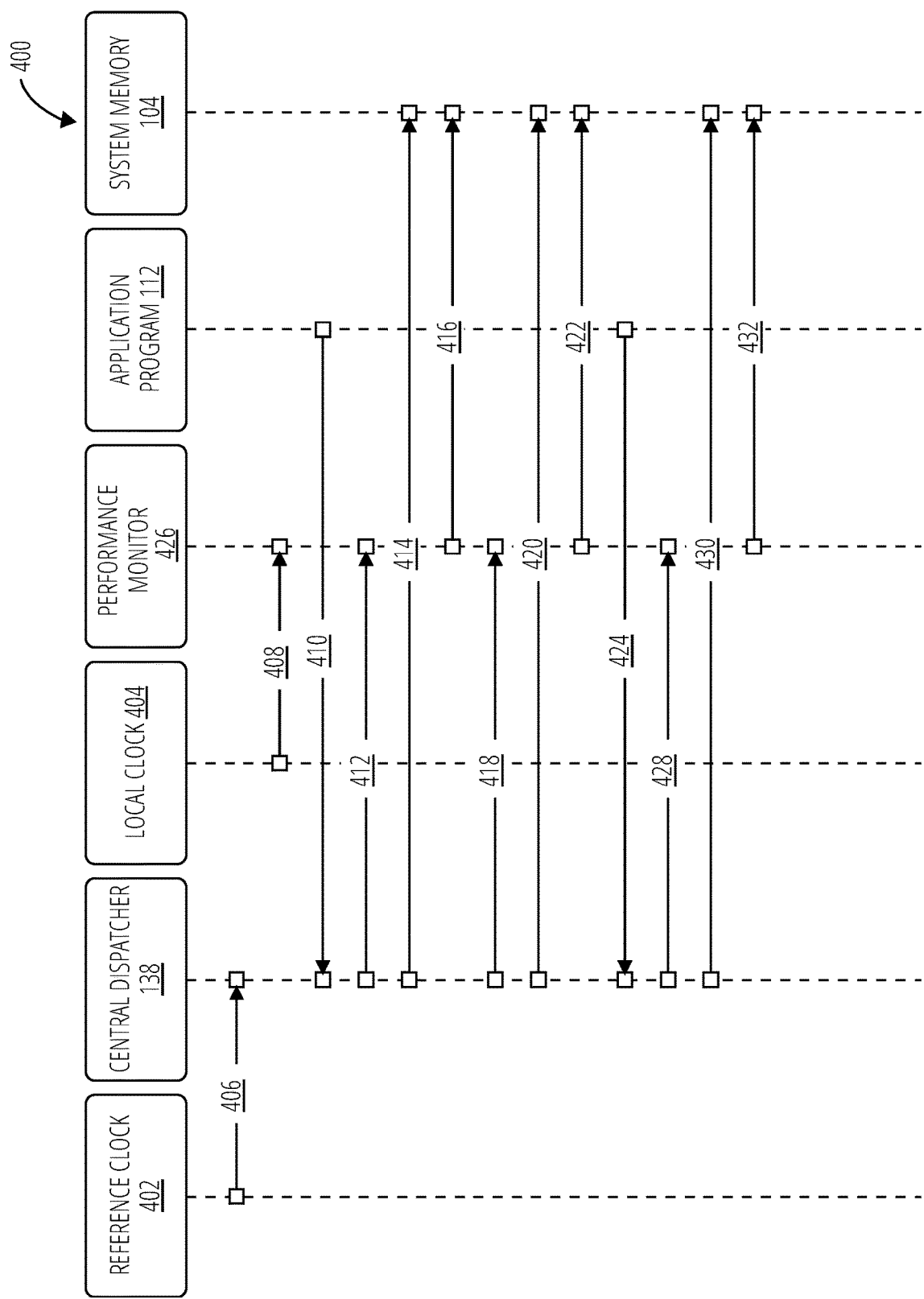
FIG. 4 is an exemplary sequence diagram 400 in accordance with an embodiment of the present invention.

FIG. 4 illustrates a timing sequence diagram for performance monitor process 400 in accordance with an embodiment of the present invention. The reference clock 402 provides a reference clock value 406 to the central dispatcher 138, and each performance monitor 426 (only one is illustrated) receives a local clock value 408 from a corresponding local clock 404. Relative to the local clocks utilized by the performance monitors, the reference clock 402 may comprise a low-drift, high-accuracy oscillator, and may be synchronized in some cases to a clock utilized by the CPU 102. Multiple performance monitors may in some cases operate from the same local clock.

The application program 112 causes a first bookmark 410 and command to be provided to the central dispatcher 138, and the central dispatcher 138 stores the first bookmark 410 for subsequent use. The command instructs the central dispatcher 138 to broadcast a trigger signal to the one or more performance monitors.

In response to the command, the central dispatcher 138 causes a trigger signal 412 to be sent to each performance monitor 426 more or less simultaneously (accounting for slight difference in signal propagation delay) and sends a reference packet 414 to be stored in the system memory 104. The reference packet 414 includes an identification of the trigger signal 412, a reference clock value 406, and the first bookmark.

In response to receiving the trigger signal 412, the performance monitor 426 sends a return packet 416 to the system memory 104. The return packet 416 includes a local clock value 408 and an identification of the trigger signal 412, and one or more values representing performance metrics associated with the logic being monitored by the performance monitor 426. The performance metrics comprise metrics obtained by the performance monitor 426 since the time the previous trigger signal (preceding the trigger signal 412) was received by the performance monitor 426.

In this example, the central dispatcher 138 sends a subsequent trigger signal 418 to the performance monitor 426 and sends another corresponding reference packet 420 to the system memory 104. The trigger signal 418 may be referred to as an internally-generated trigger signal from the central dispatcher 138. In some implementations, internally generated trigger signals may be generated periodically by the central dispatcher 138. The performance monitor 426 responds to the trigger signal 418 by sending another corresponding return packet 422 to the system memory 104.

At this point, in this example, the application program 112 sends a second bookmark 424 and command to the central dispatcher 138. The central dispatcher 138 sends another trigger signal 428 to the performance monitor 426, and another reference packet 430 to the system memory 104. The reference packet 430 now includes the second bookmark 424 instead of the first bookmark 410. The performance monitor 426 responds to the trigger signal 428 by sending a return packet 432 to the system memory 104, and so on.

Terms used herein should be accorded their ordinary meaning in the relevant arts, or the meaning indicated by their use in context.

What is claimed is:

1. An integrated circuit device comprising:
   a plurality of clock domains each with a corresponding local clock;
   a plurality of performance monitors each operating in a different clock domain; and
   a central dispatcher coupled to a reference clock, the central dispatcher configured to:
      broadcast a trigger signal to the plurality of performance monitors,
      form a reference packet indicating when the central dispatcher broadcasted the trigger signal to the plurality of performance monitors, wherein the reference packet includes a first identification of the trigger signal and a reference clock value from the reference clock, and
      save the reference packet in a memory,
   wherein each of the performance monitors is adapted to:
      respond to the trigger signal by forming a return packet to be saved in the memory; and
      respond to the trigger signal by resetting one or more local performance counts; and
   wherein the clock domains in which the plurality of performance monitors operate are correlated based on the return packets saved in the memory and the reference clock value included in the reference packet saved in the memory.

2. The integrated circuit device of claim 1, further comprising a router configured to:
   perform data reduction on the return packets from the performance monitors to form at least one aggregated return packet; and
   save the at least one aggregated return packet in the memory.

3. The integrated circuit device of claim 1, wherein each return packet
   includes: a local clock value based on the corresponding local clock;
   a second identification of the trigger signal; and
   a local performance count.

4. The integrated circuit device of claim 3, wherein the first identification and the second identification are the same, the first identification being generated by the central dispatcher, and the second identification being generated by at least one of the performance monitors.

5. The integrated circuit device of claim 1, wherein the central dispatcher is further configured to receive a command.

6. The integrated circuit device of claim 5, wherein the command is one of a broadcast a trigger signal command, a start broadcasting trigger signals periodically command, or a stop periodic broadcasting of trigger signals command.

7. The integrated circuit device of claim 1, wherein the first identification of the trigger signal indicates a total number of trigger signals broadcast by the central dispatcher.

8. The integrated circuit device of claim 1, wherein the reference packet further includes a bookmark received by the central dispatcher.

9. The integrated circuit device of claim 1, wherein the reference packet further includes a local clock value for the central dispatcher.

10. The integrated circuit device of claim 1, wherein the trigger signal comprises a binary level or edge trigger that can be transmitted on a single wire.

11. The integrated circuit device of claim 1, wherein the integrated circuit device is a graphics processing unit.

12. A method comprising:
   broadcasting a trigger signal from a central dispatcher with access to a reference clock to a plurality of performance monitors each operating in a clock domain of a corresponding local clock;
   saving, in a memory, a reference packet indicating when the central dispatcher broadcasted the trigger signal to the plurality of performance monitors, the reference packet comprising a first identification of the trigger signal and a reference clock value based on the reference clock; and for each of the performance monitors, responding to the trigger signal by forming a return packet to be saved in the memory and responding to the trigger signal by resetting one or more local performance count values, wherein clock domains in which the plurality of performance monitors operate are correlated based on the return packet of each performance monitor saved in the memory and the reference clock value included in the reference packet saved in the memory.

13. The method of claim 12, wherein each return packet includes:

a local clock value based on the corresponding local clock;

a second identification of the trigger signal; and a local performance count.

14. The method of claim 13, wherein the first identification and the second identification are the same, the first identification being generated by the central dispatcher and the second identification being generated by at least one of the performance monitors.

15. The method of claim 12, further comprising:

receiving a command, wherein the command is one of a broadcast a trigger signal command, a start broadcasting trigger signals periodically command, or a stop periodic broadcasting of trigger signals command.

16. The method of claim 12, wherein the first identification of the trigger signal indicates a total number of broadcasts of trigger signals.

17. The method of claim 12, wherein the reference packet further includes a bookmark.

18. The method of claim 12, wherein the reference packet further includes a local clock value for the central dispatcher.

19. The method of claim 12, wherein the trigger signal comprises a binary level or edge trigger that can be transmitted on a single wire.

20. The method of claim 12, wherein the performance monitors are in a central processing unit.

* * * * *